(12) United States Patent
Liu et al.

(10) Patent No.: US 12,418,626 B2
(45) Date of Patent: Sep. 16, 2025

(54) DOCKING DEVICE AND METHOD WITH VIDEO CAPTURING FUNCTION

(71) Applicant: AVerMedia TECHNOLOGIES, INC., New Taipei (TW)

(72) Inventors: Hung Wei Liu, New Taipei (TW); Shih-Heng Chen, New Taipei (TW)

(73) Assignee: AVerMedia TECHNOLOGIES, INC., New Taipei (TW)

( * ) Notice: Subject to any disclaimer, the term of this patent is extended or adjusted under 35 U.S.C. 154(b) by 164 days.

(21) Appl. No.: 18/302,776

(22) Filed: Apr. 18, 2023

(65) Prior Publication Data

US 2023/0344963 A1 Oct. 26, 2023

(30) Foreign Application Priority Data

Apr. 20, 2022 (TW) .................................. 111115110

(51) Int. Cl.
*H04N 7/10* (2006.01)
*H04N 7/01* (2006.01)

(52) U.S. Cl.
CPC ........... *H04N 7/104* (2013.01); *H04N 7/0125* (2013.01)

(58) Field of Classification Search
None
See application file for complete search history.

(56) References Cited

U.S. PATENT DOCUMENTS 10,075,325 B2 * 9/2018 Shin ...................... H04L 65/762
10,097,636 B1 * 10/2018 Maroney ................ G06F 13/28
2009/0282371 A1 * 11/2009 Curl ........................ G16H 40/60
704/275

* cited by examiner

*Primary Examiner* — John F Mortell
(74) *Attorney, Agent, or Firm* — CKC & Partners Co., LLC

(57) ABSTRACT

A docking device and method with video capturing function are provided. The docking device includes a first interface, an output interface, a second interface, a first video processor and a video capturing device. The docking device receives a first input video signal or a second input video signal from the first interface or the second interface. The first video processor generates a first output video signal with an output format in response to the first input video signal or the second input video signal. The video capturing device generates a second output data signal with a format of the Universal Serial Bus in response to the first input video signal or the second input video signal.

14 Claims, 6 Drawing Sheets

DOCKING DEVICE AND METHOD WITH VIDEO CAPTURING FUNCTION

CROSS-REFERENCE TO RELATED APPLICATION

This application claims priority to Taiwan Application Serial Number 111115110, filed Apr. 20, 2022, which is herein incorporated by reference in its entirety.

BACKGROUND

Field of Invention

The present invention relates to a docking device and method. More particularly, the present invention relates to a docking device and method with video capturing function.

Description of Related Art

In recent years, various devices related to video processing have been proposed one after another, and various related applications have become more and more diverse. In these applications, users may need to process signals from multiple input interfaces at the same time, for example, video signals from a game console (i.e., from a video capturing device) and video signals from a computer monitor (i.e., from a docking device).

However, in the prior art, if the user needs to use the video capturing device and the docking device at the same time, since each of the video capturing device and the docking device needs a corresponding video output interface, the user usually needs to purchase a display screen with dual-input to switch video sources (i.e. switching the video source to the video capturing device or the docking device), or need to connect the video capturing devices or the docking device to multiple display screens for display, increasing the cost and the inconvenience for the user.

Therefore, there is a lack of technology capable of simultaneously outputting signals received by multiple input interfaces (e.g., video signals of a game console and video signals of a computer monitor) through a single output interface (e.g., a display screen).

In addition, when the user needs to perform additional processing on multiple input video signals (e.g., displaying the video signal of the game console and the video signal of the computer monitor as a picture-in-picture), since the video capturing device and the docking device are separate and independent devices, the user needs to perform video processing passively through computer applications before performing operations such as storage, recording, etc., which reduces the overall video processing efficiency and inconvenience during use.

Accordingly, there is an urgent need for a docking technology with video capturing function to simultaneously output video signals of multiple input interfaces through a single output interface.

SUMMARY

An objective of the present disclosure is to provide a docking device. The docking device comprises a first interface, an output interface, a second interface, a first video processor, and a video capturing device. The first interface is configured to receive a first input video signal. The output interface is configured to output a first output video signal with an output format. The second interface comprises at least two channels, one of the channels is configured to receive a second input video signal, the other channel is configured to output a second output data signal, and the second interface has a Universal Serial Bus format. The first video processor is configured to perform a first video processing, and the first video processor generates the first output video signal with an output format in response to the first input video signal and/or the second input video signal. The video capturing device is configured to perform a video capturing processing, wherein the video capturing device generates the second output data signal conforming to the Universal Serial Bus format in response to the first input video signal and/or the second input video signal.

Another objective of the present disclosure is to provide a docking method with video capturing function, which is adapted for use in a docking device. The docking device comprises a first interface, an output interface, a second interface, a first video processor, and a video capturing device. The first interface is configured to receive a first input video signal. The output interface is configured to output a first output video signal with an output format. The second interface is configured to receive a second input video signal and output a second output data signal, the second interface has a Universal Serial Bus format. The first video processor is configured to perform a first video processing. The video capturing device is configured to perform a video capturing processing. The docking method comprises the following steps: receiving, by the first interface or the second interface, the first input video signal or the second input video signal; generating, by the first video processor, the first output video signal with the output format in response to the first input video signal and/or the second input video signal; and generating, by the video capturing device, the second output data signal conforming to the Universal Serial Bus format in response to the first input video signal and/or the second input video signal.

According to the above descriptions, the docking technology with video capturing function (at least including the device and the method) provided by the present disclosure receives the first input video signal or the second input video signal by the first interface or the second interface. The first video processor, in response to the first input video signal and/or the second input video signal, generates the first output video signal having the output format corresponding to the output interface, and provides it to the output interface for outputting. The video capturing device, in response to the first input video signal and/or the second input video signal, generates the second output data signal conforming to the Universal Serial Bus format. Therefore, the present disclosure solves the lack of technology in the prior art capable of simultaneously outputting signals received by multiple input interfaces (e.g., video signals of a game console and video signals of a computer monitor) through a single output interface (e.g., a display screen). In addition, since the second interface supports dual-channel simultaneous data transmission and video transmission, the second interface can simultaneously receive the first input video signal and transmit the second output data signal, so as to synchronously provide the second output data signal to the user for subsequent application (e.g., the operation of recording, storage, streaming, editing, special effects, etc.), thereby improving video processing efficiency.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a docking device and method with video capturing function according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
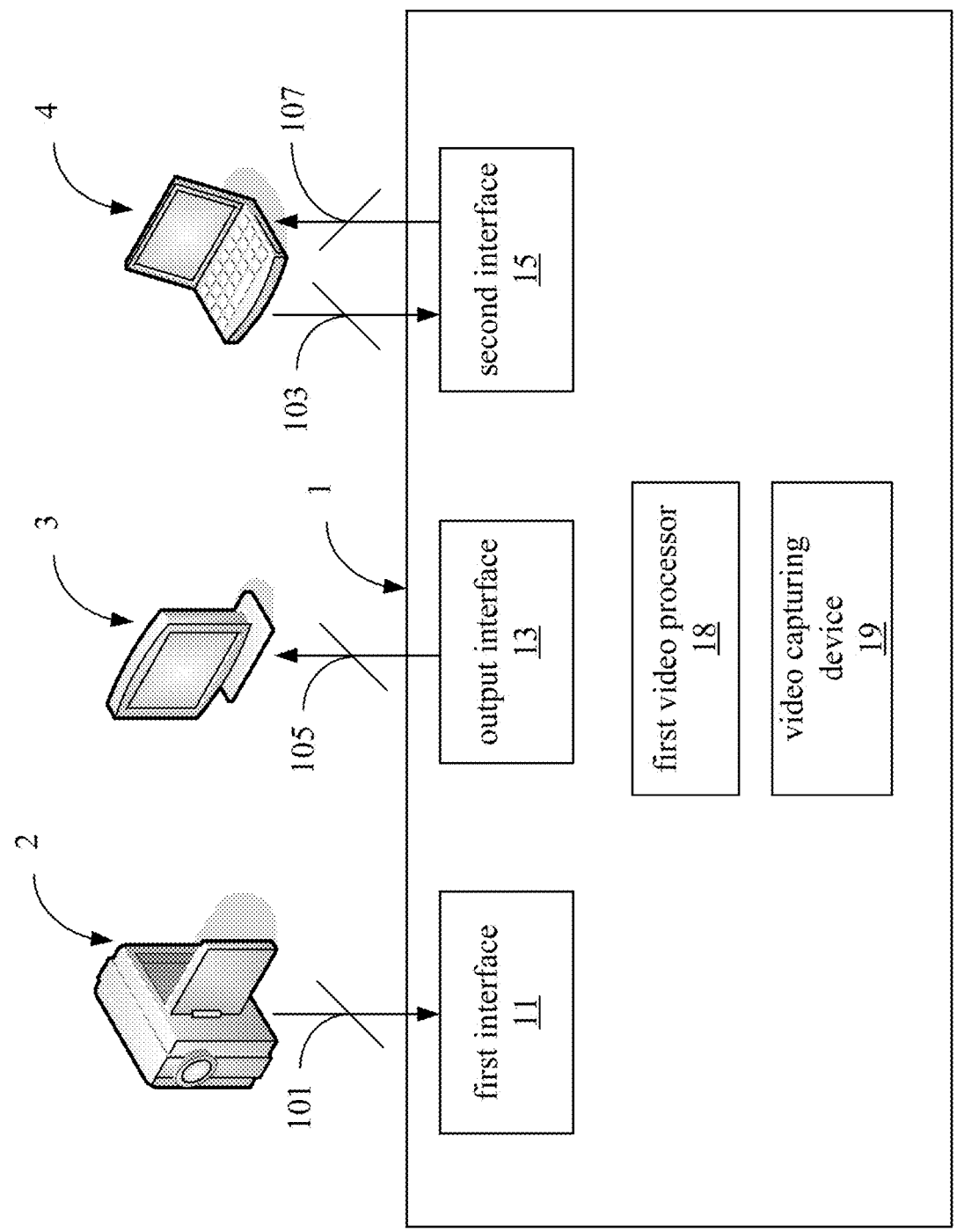
FIG. 1 is a schematic view depicting a structure diagram of a docking device with video capturing function of the first embodiment.

The first embodiment of the present disclosure is a docking device 1 with video capturing function (hereinafter referred to as: the docking device 1), and its structure schematic diagram is depicted in FIG. 1. As shown in FIG. 1, the docking device 1 comprises a first interface 11, an output interface 13, a second interface 15, a first video processor 18, and a video capturing device 19.

It shall be appreciated that the first interface 11, the output interface 13, and the second interface 15 are interfaces that can receive and transmit data, and can receive or transmit data through sources such as external devices, external web pages, and external applications. The first video processor 18 is a device or video processor operable to perform video processing operations on an input video. The video capturing device 19 is a device or a video capturing device capable of performing video capturing processing on an input video.

It shall be appreciated that the docking device 1 may also comprise other components related to the function of the docking device itself, such as: Universal Serial Bus hub (USB HUB) and other basic components related to the docking function, but the focus of this case is to expand the operation related to the video capturing function in the device, so the following paragraphs will only detail the implementation details related to the present disclosure.

First, an applicable scenario of the present embodiment will be explained, and a schematic view is depicted in FIG. 1. In the first embodiment of the present disclosure, as shown in FIG. 1, the docking device 1 is connected to the input device 2 (e.g., a game console, a media player, a camera device, etc.) through the first interface 11, the first input video signal 101 can be received from the input device 2, and the first input video signal 101 is a video signal.

In addition, the docking device 1 is connected to the output device 3 (e.g., display screen, streaming box, storage device, etc.) through the output interface 13, and the docking device 1 may transmit the first output video signal 105 to the output device 3 through the output interface 13, and the first output video signal 105 is a video signal. In addition, the docking device 1 is further connected to the input/output device 4 (e.g., notebook computer, computer host) through the second interface 15, the docking device 1 may receive the second input video signal 103 from the input/output device 4, the second input video signal 103 is a video signal, the docking device 1 may transmit the second output data signal 107 to the input/output device 4 through the second interface 15, and the second output data signal 107 is a data signal.

In this scenario, the docking device 1 receives the first input video signal 101 from the input device 2 and the second input video signal 103 from the input/output device 4. Next, the docking device 1 may perform video processing on the first input video signal 101 and/or the second input video signal 103 through the first video processor 18 to generate the first output video signal 105, and transmit the generated first output video signal 105 to the output device 3 (e.g., a display screen, a streaming box, a storage device, etc.) connected to the output interface 13 for display, streaming, storage and other uses. In addition, the docking device 1 may further use the video capturing device 19 to perform video capturing processing on the first input video signal 101 and/or the second input video signal 103 to generate the second output data signal 107, and transmit the generated second output data signal 107 to the input/output device 4 connected to the second interface 15 (e.g., a notebook computer, a computer host), so as to provide the input/output device 4 for subsequent applications (e.g., recording, storage, streaming, etc.).

The following paragraphs will more specifically describe the relevant implementation details of the docking device 1 in the first embodiment of the present disclosure, please refer to FIG. 1.

In the present embodiment, the output interface 13 is configured to output the first output video signal 105 with an output format. For example, the output interface 13 can be a video output interface, and can have video output formats such as high-definition multimedia interface (HDMI) format, C-type Universal Serial Bus format (USB TYPE-C), etc., for outputting the first output video signal 105 conforming to the output format (e.g., HDMI or USB TYPE-C) of the output interface.

In addition, in the present embodiment, the second interface 15 has a Universal Serial Bus format, for example: type C Universal Serial Bus format (USB TYPE-C). It shall be appreciated that the Type-C Universal Serial Bus format supports dual-channel simultaneous data transmission and audio/video transmission operations (e.g., audio/video signal transmission through DisplayPort Alt mode). Therefore, in the present disclosure, the docking device 1 utilizes at least two channels of the second interface 15, one of the channels is configured to receive a second input video signal 103, and the other channel is configured to output a second output data signal 107. In other words, the docking device 1 may simultaneously receive the second input video signal 103 through the second interface 15 and transmit the second output data signal 107 generated after being processed by the video capturing device 19. Through these operations, the video can be processed synchronously without delay.

In some embodiments, the first interface 11 can be the first input interface, and can have a high-quality multimedia interface format or other formats (e.g., VGA, DVI, DP, SDI, YPbPr, S-Video, CVBS) and other video input formats, and the first interface 11 is configured to receive the first input video signal 101 having the high-definition multimedia interface format or other formats.

First, in the present embodiment, the docking device 1 receives the first input video signal 101 or the second input video signal 103 from the first interface 11 or the second interface 15. For example, the first input video signal 101 can be a game video of a game console, and the second input video signal 103 can be a display video of a computer host screen.

Next, the first video processor 18 performs video processing on the received video to generate a video conforming to the output format of the output interface 13. For example, the video processing operation may include at least one of a video format conversion operation, a code conversion operation, a video optimization operation, a picture-in-picture generation operation, a video switching operation, a logo insertion operation, or a combination thereof. Specifically, the first video processor 18 generates the first output video signal 105 having an output format corresponding to the output interface 13 in response to the first input video signal 101 and/or the second input video signal 103.

For example, the first video processor 18 can convert the second input video signal 103 having DisplayPort (DP) format into a high-definition multimedia interface format, and then combine the converted second input video signal 103 with the first input video signal 101 to generate a picture-in-picture (i.e., the first input video signal 101 and the second input video signal 103 are divided into picture-in-picture blocks and displayed together). In some embodiments, the first video processor 18 can be implemented by a software or hardware circuit, such as a processor, a main control unit (MCU), a system on a chip (SoC), a field programmable gate arrays (FPGA) and the like, and the present disclosure is not limited thereto.

In addition, the video capturing device 19 performs video capturing processing on the received video to generate output data that conforms to the output format of the second interface 15 (e.g., a data packet that conforms to the Universal Serial Bus format), and the user can perform subsequent applications according to the output data. Specifically, the video capturing device 19 generates the second output data signal 107 conforming to the Universal Serial Bus format in response to the first input video signal 101 and/or the second input video signal 103.

In some embodiments, the video capturing device 19 further comprises a receiver (not shown) for receiving the first input video signal 101 or the second input video signal 103. In some embodiments, the video capturing device 19 further comprises a second video processor (not shown), which performs video processing on the first input video signal 101 and/or the second input video signal 103. In some embodiments, the second video processor may be a bridge, which performs video processing on the first input video signal 101 and/or the second input video signal 103 to generate output data conforming to the output format of the second interface 15 (e.g., data packets conforming to the Universal Serial Bus format). In the present embodiment, the generated second output data signal 107 is used for illustration, and the generated second output data signal 107 is transmitted to the input/output device 4 connected to the second interface 15 to provide the input/output device 4. In other embodiments, the video processing operation may include at least one of a video format conversion operation, a code conversion operation, data unpacking/packaging operation, a video optimization operation, a picture-in-picture generation operation, and a video switching operation, a logo insertion operation, or a combination thereof. In some embodiments, the second video processor performs the same video processing as the first video processor 18 for the incoming first input video signal 101 or second input video signal 103. In some embodiments, the second video processor can be implemented by a software or hardware circuit, such as a processor, a main control unit (MCU), a system on a chip (SoC), a field programmable gate array (FPGA) and the like, and the present disclosure is not limited thereto.

It shall be appreciated that the present disclosure does not limit the operational priority of the first video processor 18 and the video capturing device 19. Therefore, the operations of the first video processor 18 and the video capturing device 19 can execute their respective operations in parallel simultaneously.

It shall be appreciated that Type-C Universal Serial Bus format supports dual-channel simultaneous data transmission and audio/video transmission operations. Therefore, in the present disclosure, the docking device 1 utilizes at least two channels of the second interface 15, one of the channels is configured to receive a second input video signal 103, and the other channel is configured to output a second output data signal 107. In other words, the docking device 1 may simultaneously receive the second input video signal 103 through the second interface 15 and transmit the second output data signal 107 generated after being processed by the video capturing device 19.

Through the aforementioned operations, the user of the input/output device 4 can play the first output video signal 105 (i.e., the video signal generated by the first video processor 18) on the output device 3 (such as a display screen) at the same time, and can obtain the second output data signal 107 synchronously (i.e., the data packet generated by the video capturing device 19), so as to smoothly perform the operations of recording, storing, streaming, etc.

In some embodiments, the docking device 1 may also comprise a physical button for controlling or switching the video processing operations of the video processor (e.g., the first video processor and the second video processor). For example, the user can directly switch through the physical buttons to perform a video optimization operation, a picture-in-picture generation operation, a video switching operation, or a logo insertion operation on the input video.

Figure 2:
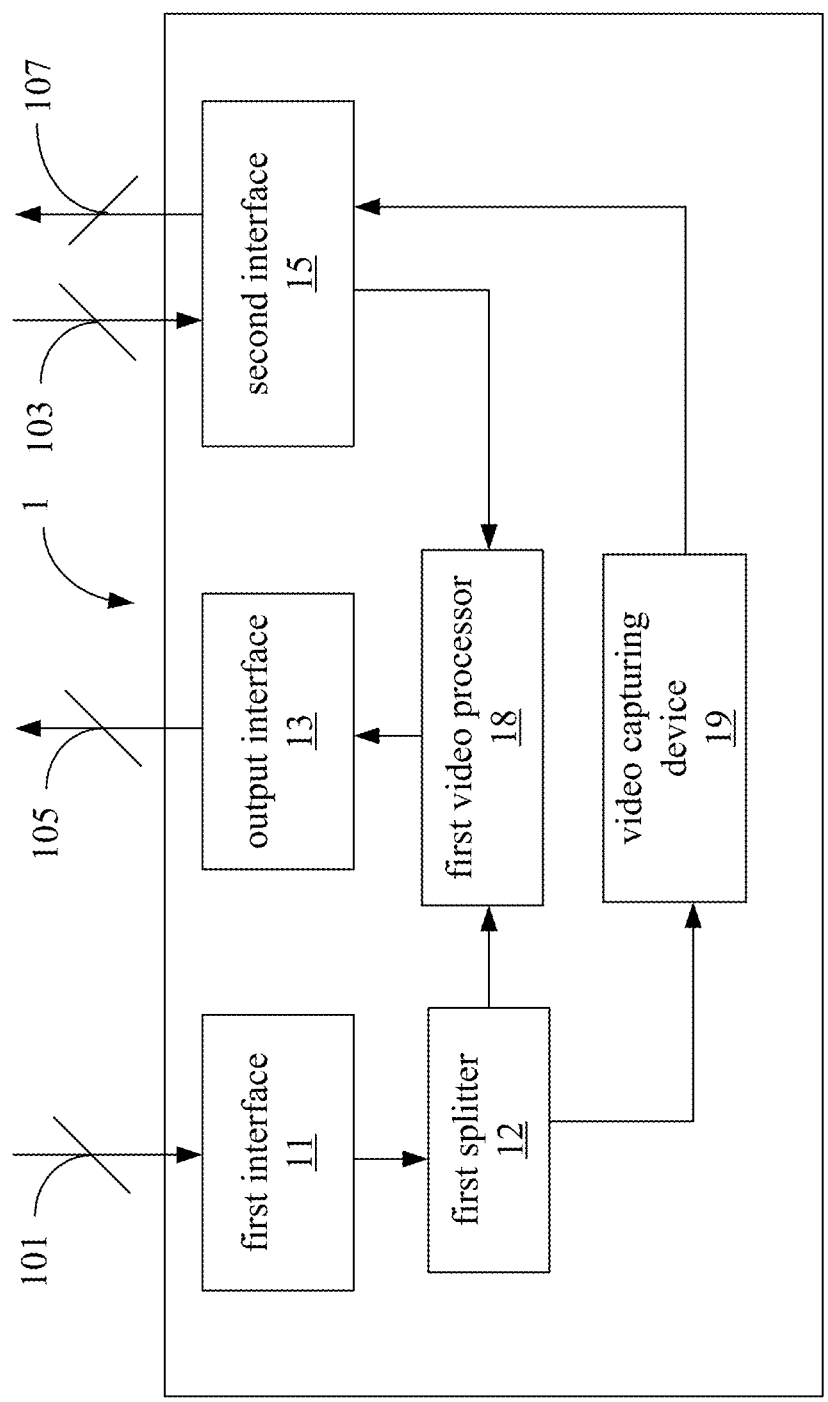
FIGS. 2-4 are schematic views depicting the connection of components of the docking device of some embodiments.

In some embodiments, the docking device 1 may further comprise a first splitter or a second splitter for splitting the input signal received from the first interface 11 or the second interface 15. For ease of understanding, an example will be used below to illustrate the connection schematic diagram of components including the first splitter in the docking device 1, please refer to FIG. 2. In FIG. 2, the docking device 1 further comprises a first splitter 12.

In the present example, the first splitter 12 is electrically connected to the first interface 11, the first video processor 18, and the video capturing device 19. The first splitter 12 outputs the first input video signal 101 to the first video processor 18 and the video capturing device 19 in response to receiving the first input video signal 101 from the first interface 11. The second interface is electrically connected to the first video processor 18 and the video capturing device 19 respectively. The second interface 15 comprises at least two channels, one of the channels is configured to receive a second input video signal 103, and the other channel is configured to output the second output data signal 107.

The first video processor 18 is electrically connected to the first splitter 12, the output interface 13, and the second interface 15. When the docking device 1 receives the first input video signal 101 from the first interface 11, the first video processor 18 performs video processing (e.g., generating a first output video signal 105 with an output format corresponding to the output interface 13) in response to receiving the first input video signal 101, and transmits the video to the output interface 13. If the format of the first input video signal 101 is the same as the output format of the output interface 13, the signal can also be passed through without format conversion. The video capturing device 19 performs video capturing processing on the received first input video signal 101 to generate output data conforming to the output format of the second interface 15, and outputs a second output data signal 107 through a channel of the second interface 15.

Figure 3:
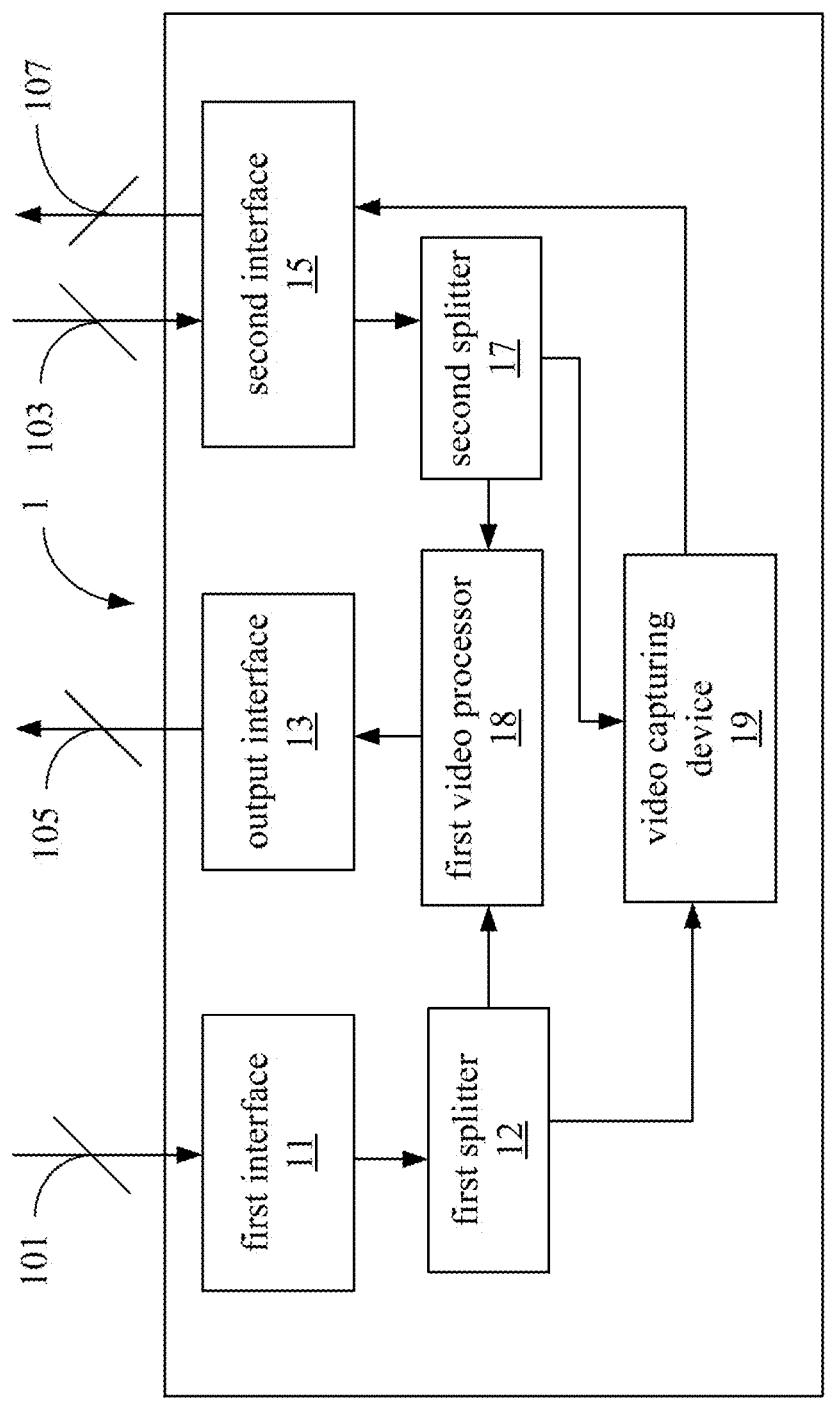

FIG. 3 is a schematic diagram of component connection in another embodiment. In FIG. 3, similar components related to the embodiment in FIG. 2 are represented by the same reference numerals for easy understanding, and the specific principles of similar components have been explained in detail in the previous paragraphs, and if it is not necessary to introduce the cooperative operation relationship with the components in FIG. 3, it will not be repeated here. The difference between FIG. 3 and FIG. 2 is that the docking device 1 further comprises a second splitter for splitting the input signal received from the second interface 15. In the present example, the second splitter 17 is electrically connected to the second interface 15, the first video processor 18, and the video capturing device 19, and the second splitter 17 outputs the second input video signal 103 to the first video processor 18 and the video capturing device 19 in response to receiving the second input video signal 103 from the second interface 15. The first video processor 18 is electrically connected to the first splitter 12, the output interface 13, and the second splitter 17. The video capturing device 19 is electrically connected to the first splitter 12, the output interface 13, the second splitter 17, and the second interface 15.

In an application scenario, when the docking device 1 receives a second input video signal 103 from one of the channels of the second interface 15, the first video processor 18 performs a video processing in response to receiving the second input video signal 103 (e.g., generating the first output video signal 105 with an output format corresponding to the output interface 13), and transmits to the output interface 13. If the format of the second input video signal 103 is the same as the output format of the output interface 13, the signal can also be passed through without format conversion. The video capturing device 19 performs video capturing processing in response to receiving the second input video signal 103 to generate output data conforming to the output format of the second interface 15 (e.g., a data packet conforming to the Universal Serial Bus format), and outputs a second output data signal 107 through a channel of the second interface 15.

In another application scenario, when the docking device 1 receives a first input video signal 101 from the first interface 11 and a second input video signal 103 from one channel of the second interface 15, the first video processor 18 performs a video processing in response to receiving the first input video signal 101 and/or the second input video signal 103. For example, a corresponding first output video signal 105 can be generated in response to the first input video signal 101, or a corresponding first output video signal 105 can be generated in response to the second input video signal 103, or a corresponding first output video signal 105 can be generated in response to the first input video signal 101 and the second input video signal 103. For example, generating a corresponding picture-in-picture (PIP) video signal, double picture (PBP) video signal, or individual frame video signal (e.g., the output signal corresponding to the first input video signal 101, or the output signal corresponding to the second input video signal 103), which are not limited here, and transmitting the first output video signal 105 to the output interface 13. In some embodiments, the docking device 1 may have multiple (e.g., more than two) output interfaces 13, and the first video processor 18 correspondingly generates multiple (e.g., more than two) first output video signals 105, and transmits to multiple (e.g., more than two) output interfaces 13. In some embodiments, the first video processor 18 responds to receiving the first input video signal 101 and/or the second input video signal 103 to control the input of the first input video signal 101 and/or the second input video signal 103. For example, when the first video processor 18 responds to receiving the first input video signal 101 and the second input video signal 103, the first video processor 18 generates an instruction (e.g., a stop outputting video signal) and transmits to the input/output device 4 through the second interface 15 to control the input/output device 4 to stop outputting the second input video signal 103. In other embodiments, the first video processor 18 may also generate a control instruction to control the splitter switching and stop the output video signal to be input to the first video processor. The video capturing device 19 performs a video capturing processing in response to receiving the first input video signal 101 and/or the second input video signal 103, for example, a corresponding second output data signal 107 can be generated in response to the first input video signal 101, or a corresponding second output data signal 107 can be generated in response to the second input video signal 103, or a corresponding first output video signal 105 can be generated in response to the first input video signal 101 and the second input video signal 103, and transmit the second output data signal 107 to the second interface 15 to output the second output data signal 107 through a channel of the second interface 15. In some embodiments, the video capturing device 19 is used to control the input of the first input video signal 101 and/or the second input video signal 103 in response to receiving the first input video signal 101 and/or the second input video signal 103, for example, when the video capturing device 19 responds to receiving the first input video signal 101 and the second input video signal 103, the video capturing device 19 generates an instruction (e.g., a stop outputting video signal) and transmits to the input/output device 4 through the second interface 15 to control the input/output device 4 to stop outputting the second input video signal 103. In other embodiments, the video capturing device 19 may also generate a control instruction to control the splitter switching and stop the output video signal to be input to the video capturing device 19. In some implementations, the examples listed above can exist independently or be used in combination, which is not limited here.

In some embodiments, the docking device 1 further comprises a converter, which may be a video format converter, and the converter is used to directly perform a video format conversion on the input signal. In some embodiments, the converter may comprise a scaler, a frame rate converter, a color space converter, a high dynamic range (HDR) to standard dynamic range (SDR) converter. In some embodiments, the converter further provides a bypass function.

Figure 4:
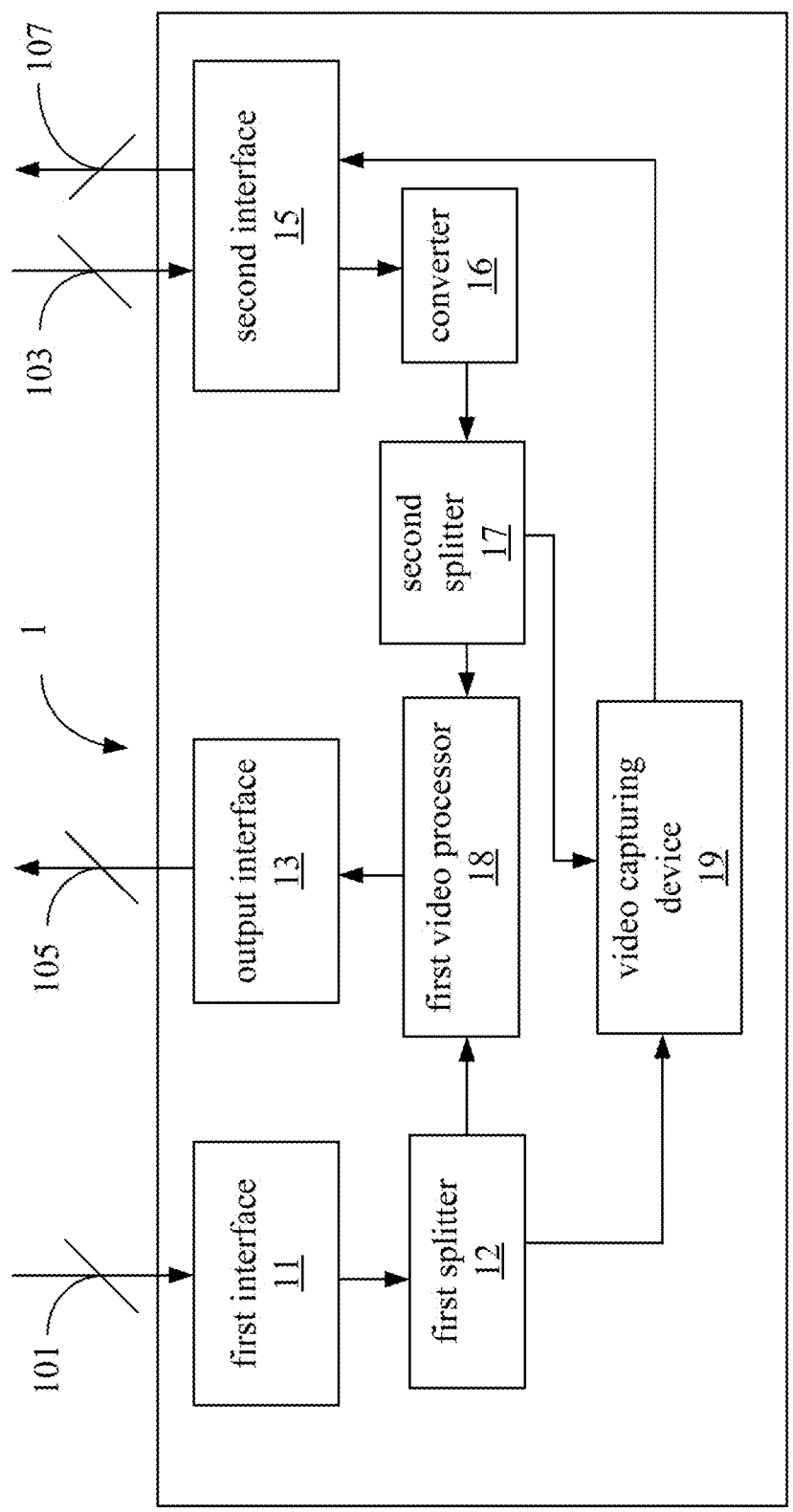

For ease of understanding, an example will be given below to illustrate the connection schematic diagram of the docking device 1 comprising the first splitter, the second splitter, and the converter, please refer to FIG. 4. In FIG. 4, the docking device 1 further comprises the first splitter 12, the second splitter 17, and the converter 16.

In the present example, the converter 16 is electrically connected to the second interface 15, and the second splitter 17 is electrically connected to the converter 16, the first video processor 18, and the video capturing device 19. In addition, the converter 16 converts the second input video signal 103 into the second input video signal 103 having the output format (e.g., the HDMI format) in response to the second input video signal 103 (e.g., the DP format) received from the second interface 15, and the second splitter 17 outputs the second input video signal 103 to the first video processor 18 and the video capturing device 19 in response to the second input video signal 103 received from the converter 16. In other words, when the videos are input or output through different interfaces, if the video formats between the interfaces are different, a converter can be provided therebetween to convert the video signal to the video format that conforms to the output interface.

In some embodiments, the first input video signal 101, the first output video signal 105, the second input video signal 103, or the second output data signal 107 may only comprise a video signal or an audio signal, those skilled in the art should be able to understand the operations when there is only a single signal based on the foregoing content, so no further details are given.

Figure 5:
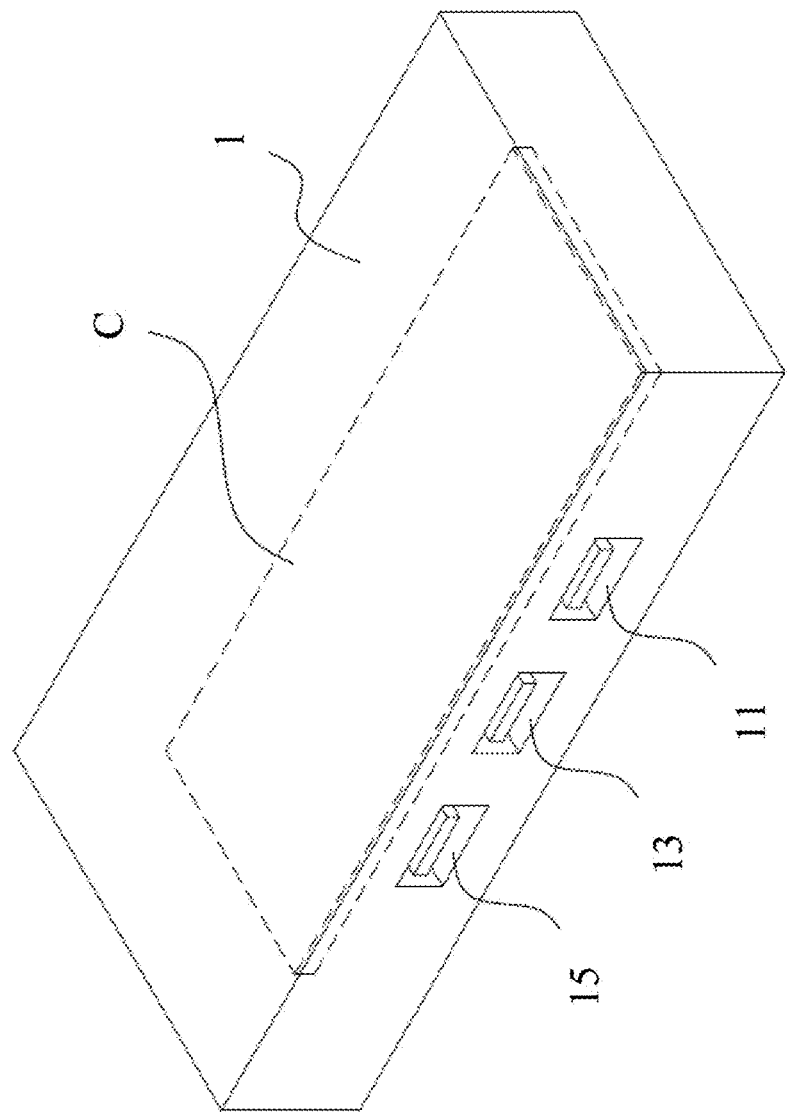
FIG. 5 is a schematic view depicting a diagram of a docking device of some embodiments.

In some embodiments, each component in the docking device 1 can be integrated into the substrate (e.g., a printed circuit board) by an integrated circuit to form a circuit capable of performing the same function. For example, please refer to FIG. 5, which is a schematic diagram of an implementation of the docking device. The docking device 1 can integrate the first interface 11, the output interface 13, the second interface 15, the first video processor 18, the video capturing device 19, the first splitter 12, the second splitter 17, the converter 16 and other components to the circuit board C to implement all functions and structures of the docking device 1.

According to the above descriptions, the docking device 1 provided by the present disclosure receives the first input video signal or the second input video signal by the first interface or the second interface. The first video processor, in response to the first input video signal and/or the second input video signal, generates the first output video signal having the output format corresponding to the output interface, and provides it to the output interface for outputting. The video capturing device, in response to the first input video signal and/or the second input video signal, generates the second output data signal conforming to the Universal Serial Bus format. Therefore, the present disclosure solves the lack of technology in the prior art capable of simultaneously outputting signals received by multiple input interfaces (e.g., video signals of a game console and video signals of a computer monitor) through a single output interface (e.g., a display screen). In addition, since the second interface supports dual-channel simultaneous data transmission and video transmission, the second interface can simultaneously receive the first input video signal and transmit the second output data signal, so as to synchronously provide the second output data signal to the user for subsequent application (e.g., the operation of recording, storage, streaming, editing, special effects, etc.), thereby improving video processing efficiency.

Figure 6:
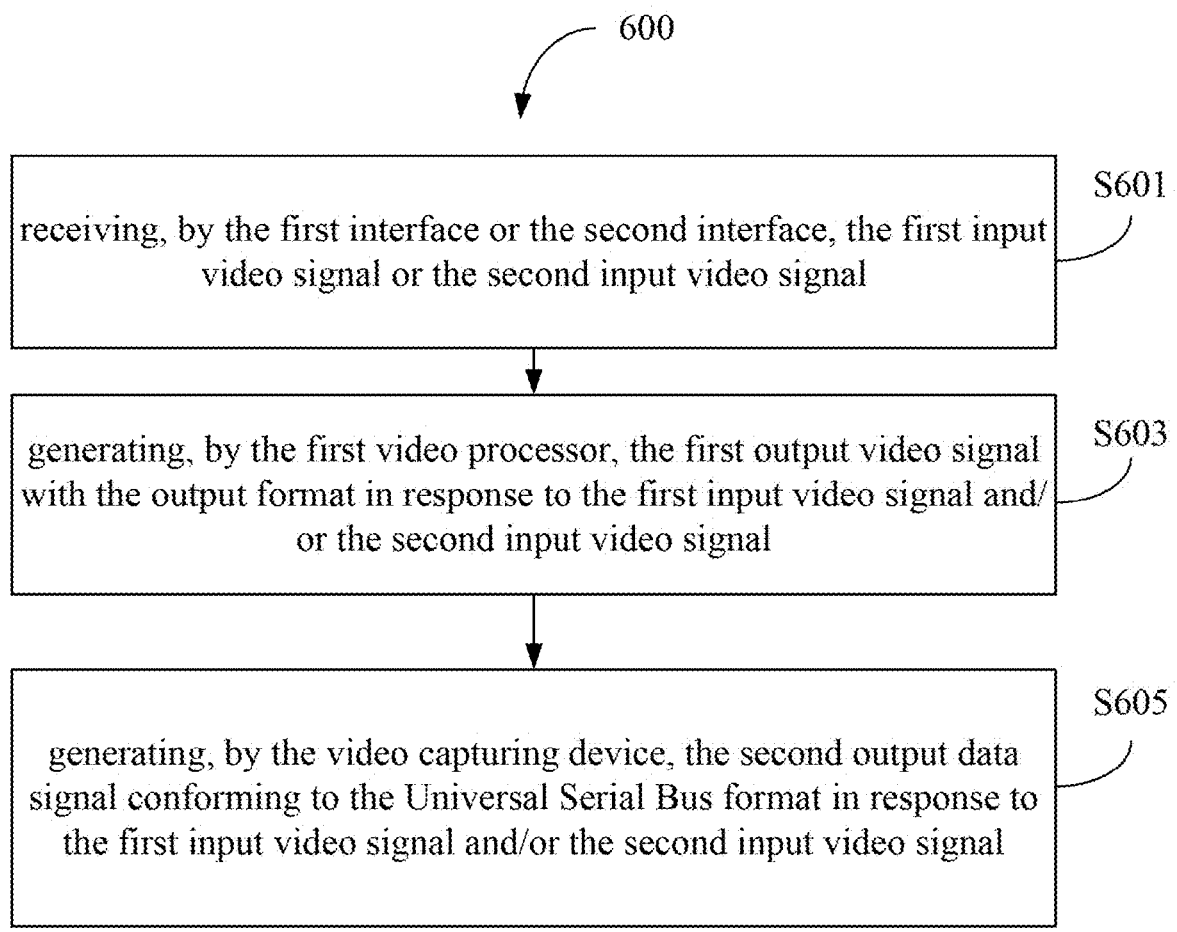
FIG. 6 is a partial flowchart depicting a docking method with video capturing function of the second embodiment.

A second embodiment of the present disclosure is a docking method with video capturing function (hereinafter referred to as: the docking method) and a flowchart thereof is depicted in FIG. 6. The docking method 600 is adapted for use in a docking device (e.g., the docking device 1 of the first embodiment). The docking device comprises a first interface, an output interface, a second interface, a first video processor, and a video capturing device (e.g., the first interface 11, the output interface 13, the second interface 15, the first video processor 18, and the video capturing device 19 of the first embodiment).

The first interface is configured to receive a first input video signal. The output interface is configured to output a first output video signal with an output format. The second interface is configured to receive a second input video signal and output a second output data signal, and the second interface has a Universal Serial Bus format. The first video processor is configured to perform a first video processing. The video capturing device is configured to perform a video capturing processing. The docking method 600 outputs the first output video signal and the second output data signal through the steps S601 to S605.

In the step S601, the first interface or the second interface receives the first input video signal or the second input video signal. Next, in the step S603, the first video processor generates the first output video signal with the output format in response to the first input video signal and/or the second input video signal. Next, in the step S605, the video capturing device generates the second output data signal conforming to the Universal Serial Bus format in response to the first input video signal and/or the second input video signal.

In some embodiments, the video capturing device further comprises a second video processor, and the docking method 600 further comprises the following steps: performing, by the second video processor, a second video processing on the first input video signal and/or the second input video signal to generate the second output data signal in response to receiving the first input video signal and/or the second input video signal by the video capturing device.

In some embodiments, the docking device further comprises a first splitter, and the docking method 600 further comprises the following steps: outputting, by the first splitter, the first input video signal to the first video processor and the video capturing device in response to receiving the first input video signal from the first interface.

In some embodiments, the docking device further comprises a second splitter, and the docking method 600 further comprises the following steps: outputting, by the second splitter, the second input video signal to the first video processor and the video capturing device in response to receiving the second input video signal from the second interface.

In some embodiments, the docking device further comprises a converter and a second splitter, and the docking method 600 further comprises the following steps: converting, by the converter, the second input video signal into the second input video signal with the output format in response to receiving the second input video signal from the second interface; and outputting, by the second splitter, the second input video signal to the first video processor and the video capturing device in response to receiving the second input video signal from the converter.

In some embodiments, the docking device further comprises a converter, and the docking method 600 further comprises the following steps: converting, by the converter, the second input video signal into the second input video signal with the output format in response to receiving the second input video signal from the second interface.

In some embodiments, the docking device further comprises a second splitter, and the docking method 600 further comprises the following steps: outputting, by the second splitter, the second input video signal to the first video processor and the video capturing device in response to receiving the second input video signal from a converter.

In some embodiments, the first interface has a high-definition multimedia interface format, and the first interface is configured to receive the first input video signal with the high-definition multimedia interface format.

In some embodiments, part or all of the process of the docking method described in the present disclosure can be executed by an integrated circuit, and is suitable for an docking device.

In addition to the aforesaid steps, the second embodiment can also execute all the operations and steps of the docking device 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present disclosure, some words (e.g., the interface, the input signal, the output signal, the video processing, the video processor and the splitter, etc.) are preceded by terms such as "first" and "second", and these terms of "first" and "second" are only used to distinguish these different words. For example, the "first" and "second" input video signal are only used to indicate the input video signal used in different operations. Furthermore, when an element is referred to as "connected", it may mean "electrically connected". "connected" and "electrically connected" can be used to indicate direct or indirect electrical coupling or telecommunication coupling between two or more components, and can also be used to indicate that two or more components cooperate with each other to operate or interact. In addition, the term "in response to a signal" as used herein can be used to describe the signal received directly or indirectly, where the signal can be used to mean any one of the processed signal, the converted signal, the unprocessed signal, the unconverted signal, or a combination thereof. The words "comprising", "including", "having", and "containing" are all open-ended terms, meaning "including but not limited to". In addition, "and/or" used herein includes any one and all combinations of one or more items in the relevant listed items.

According to the above descriptions, the docking technology with video capturing function (at least including the device and the method) provided by the present disclosure receives the first input video signal or the second input video signal by the first interface or the second interface. The first video processor, in response to the first input video signal and/or the second input video signal, generates the first output video signal having the output format corresponding to the output interface, and provides it to the output interface for outputting. The video capturing device, in response to the first input video signal and/or the second input video signal, generates the second output data signal conforming to the Universal Serial Bus format. Therefore, the present disclosure solves the lack of technology in the prior art capable of simultaneously outputting signals received by multiple input interfaces (e.g., video signals of a game console and video signals of a computer monitor) through a single output interface (e.g., a display screen). In addition, since the second interface supports dual-channel simultaneous data transmission and video transmission, the second interface can simultaneously receive the first input video signal and transmit the second output data signal, so as to synchronously provide the second output data signal to the user for subsequent application (e.g., the operation of recording, storage, streaming, editing, special effects, etc.), thereby improving video processing efficiency.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A docking device with video capturing function, comprising:
    a first interface, being configured to receive a first input video signal;
    an output interface, being configured to output a first output video signal with an output format, wherein the output interface has a high-definition multimedia interface (HDMI) format;
    a second interface, comprising at least two channels, wherein one of the channels is configured to receive a second input video signal, the other channel is configured to output a second output data signal, and the second interface has a Universal Serial Bus format;
    a first video processor, being electrically connected to the first interface, the output interface, and the second interface, and being configured to perform a first video processing, wherein the first video processor generates the first output video signal with an output format in response to the first input video signal and/or the second input video signal;
    a video capturing device, being electrically connected to the first interface and the output interface, and being configured to perform a video capturing processing, wherein the video capturing device generates the second output data signal conforming to the Universal Serial Bus format in response to the first input video signal and/or the second input video signal;
    a first splitter, being electrically connected to the first interface, the first video processor, and the video capturing device; and
    a second splitter, being electrically connected to the second interface, the first video processor, and the video capturing device;
    wherein the first splitter outputs the first input video signal to the first video processor and the video capturing device in response to receiving the first input video signal from the first interface;
    wherein the second splitter outputs the second input video signal to the first video processor and the video capturing device in response to receiving the second input video signal from the second interface;
wherein the first output video signal is a video signal and the second output data signal is a data signal.

2. The docking device of claim 1, wherein the video capturing device further comprises:
a second video processor,
wherein the second video processor further performs the following operations:
performing a second video processing on the first input video signal and/or the second input video signal to generate the second output data signal in response to receiving the first input video signal and/or the second input video signal by the video capturing device.

3. The docking device of claim 1, wherein the docking device further comprises:
a converter, electrically connected to the second interface, wherein
the second splitter, is electrically connected to the converter, the first video processor, and the video capturing device.

4. The docking device of claim 3, wherein the converter further performs the following operations:
converting the second input video signal into the second input video signal with the output format in response to receiving the second input video signal from the second interface.

5. The docking device of claim 3, wherein the second splitter further performs the following operations:
outputting the second input video signal to the first video processor and the video capturing device in response to receiving the second input video signal from the converter.

6. The docking device of claim 1, wherein the first interface has a high-definition multimedia interface format, and the first interface is configured to receive the first input video signal with the high-definition multimedia interface format.

7. A docking method with video capturing function, being adapted for use in a docking device, wherein the docking device comprises a first interface, an output interface, a second interface, a first video processor, a first splitter, a second splitter, and a video capturing device, the first video processor is electrically connected to the first interface, the output interface, and the second interface, the video capturing device is electrically connected to the first interface and the output interface, the first splitter is electrically connected to the first interface, the first video processor, and the video capturing device, the second splitter is electrically connected to the second interface, the first video processor, and the video capturing device, the first interface is configured to receive a first input video signal, the output interface is configured to output a first output video signal with an output format, the output interface has a high-definition multimedia interface (HDMI) format, the second interface is configured to receive a second input video signal and output a second output data signal, the second interface has a Universal Serial Bus format, the first video processor is configured to perform a first video processing, the video capturing device is configured to perform a video capturing processing, and the docking method comprises the following steps:
receiving, by the first interface or the second interface, the first input video signal or the second input video signal;
generating, by the first video processor, the first output video signal with the output format in response to the first input video signal and/or the second input video signal; and
generating, by the video capturing device, the second output data signal conforming to the Universal Serial Bus format in response to the first input video signal and/or the second input video signal;
wherein the docking method further comprises the following steps:
outputting, by the first splitter, the first input video signal to the first video processor and the video capturing device in response to receiving the first input video signal from the first interface; and
outputting, by the second splitter, the second input video signal to the first video processor and the video capturing device in response to receiving the second input video signal from the second interface;
wherein the first output video signal is a video signal and the second output data signal is a data signal.

8. The docking method of claim 7, wherein the video capturing device further comprises a second video processor, and the docking method further comprises the following steps:
performing, by the second video processor, a second video processing on the first input video signal and/or the second input video signal to generate the second output data signal in response to receiving the first input video signal and/or the second input video signal by the video capturing device.

9. The docking method of claim 7, wherein the docking device further comprises a converter, and the docking method further comprises the following steps:
converting, by the converter, the second input video signal into the second input video signal with the output format in response to receiving the second input video signal from the second interface.

10. The docking method of claim 7, wherein the docking method further comprises the following steps:
outputting, by the second splitter, the second input video signal to the first video processor and the video capturing device in response to receiving the second input video signal from a converter.

11. The docking method of claim 7, wherein the docking device further comprises a converter, and the docking method further comprises the following steps:
converting, by the converter, the second input video signal into the second input video signal with the output format in response to receiving the second input video signal from the second interface; and
outputting, by the second splitter, the second input video signal to the first video processor and the video capturing device in response to receiving the second input video signal from the converter.

12. The docking method of claim 7, wherein the first interface has a high-definition multimedia interface format, and the first interface is configured to receive the first input video signal with the high-definition multimedia interface format.

13. The docking device of claim 1, wherein the docking device further comprises multiple second output interfaces, and the first video processor correspondingly generates multiple second output video signals, and transmits the second output video signals to the second output interfaces.

14. The docking method of claim 7, wherein the docking device further comprises multiple second output interfaces, and the first video processor correspondingly generates multiple second output video signals, and transmits the second output video signals to the second output interfaces.

* * * * *